(12) United States Patent
Tomioka et al.

(10) Patent No.: US 7,485,876 B2
(45) Date of Patent: Feb. 3, 2009

(54) LASER SCANNING MICROSCOPE

(75) Inventors: Masaharu Tomioka, Tokyo (JP); Tatsuo Nakata, Tokyo (JP); Hiroshi Sasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 38 days.

(21) Appl. No.: 11/711,407

(22) Filed: Feb. 27, 2007

(65) Prior Publication Data

US 2007/0205378 A1 Sep. 6, 2007

(30) Foreign Application Priority Data

Mar. 3, 2006 (JP) ............................. 2006-057647

(51) Int. Cl.
*G01J 1/58* (2006.01)
(52) U.S. Cl. .................................. 250/458.1
(58) Field of Classification Search ............... 250/234, 250/458.1; 354/385
See application file for complete search history.

(56) References Cited

U.S. PATENT DOCUMENTS 6,094,300 A 7/2000 Kashima et al.

| | | |
|---|---|---|
| 2004/0120034 A1 | 6/2004 | Miyawaki et al. |
| 2005/0122579 A1 | 6/2005 | Sasaki |
| 2005/0253056 A1 | 11/2005 | Nakata |
| 2007/0006615 A1 | 1/2007 | Miyawaki et al. |

FOREIGN PATENT DOCUMENTS

| | | |
|---|---|---|
| EP | 1 424 579 A1 | 6/2004 |
| EP | 1 596 238 A2 | 11/2005 |
| JP | 2005-308985 A | 11/2005 |

*Primary Examiner*—David P Porta
*Assistant Examiner*—Faye Boosalis
(74) *Attorney, Agent, or Firm*—Frishauf, Holtz, Goodman & Chick, P.C.

(57) ABSTRACT

A laser scanning microscope includes an exciting observation light source, a stimulation light source, a first scanning portion that two-dimensionally scans the exciting observation light across a specimen, a second scanning portion that sets an incident position of the stimulation light on the specimen, an optical path combining portion that brings the exciting observation light and the stimulation light to an identical optical path, an objective lens that irradiates the specimen with the exciting observation light and/or the stimulation light while collecting fluorescence light emitted from the specimen, and a detecting portion that detects the collected fluorescence light, the optical path combining portion being disposed so as to be in an optically conjugate relationship with the first scanning portion and the second scanning portion.

15 Claims, 10 Drawing Sheets

LASER SCANNING MICROSCOPE

BACKGROUND OF THE INVENTION

1. Field of the Invention

The present invention relates to a laser scanning microscope.

This application is based on Japanese Patent Application No. 2006-057647, the content of which is incorporated herein by reference.

2. Description of Related Art

A laser scanning microscope is known in which an observation laser light source and a stimulation laser light source are provided, and observation laser light and stimulation laser light are two-dimensionally scanned across a specimen by discrete scanning means (see, for example, Japanese Unexamined Patent Application, Publication No. 2005-308985). The laser scanning microscope disclosed in Japanese Unexamined Patent Application, Publication No. 2005-308985 is equipped with dichroic mirrors that combine optical paths of observation laser light and stimulation laser light, and also another dichroic mirror that separates observation laser light and fluorescence light propagating along an identical optical path. The dichroic mirrors function so as to combine or separate observation laser light and stimulation laser light, or observation laser light and fluorescence light by utilizing the wavelength dependence of light. Therefore, in the case when the wavelength of any laser light is changed due to a change in the light source, or the like, the dichroic mirror has to be switched to or replaced with an optimum one that matches the laser light wavelength.

The laser scanning microscope disclosed in Japanese Unexamined Patent Application, Publication No. 2005-308985 has a function of correcting an optical axis deviation caused by a change in a reflecting angle and/or a reflecting position of the dichroic mirror, so it is possible to apply the stimulation laser light exactly onto a targeted point on the specimen even if the observation method is changed.

It is noted, however, the configuration of the laser scanning microscope disclosed in Japanese Unexamined Patent Application, Publication No. 2005-308985 is complicated due to the inclusion of storage means for storing correction information concerning the position deviation, and also the inclusion of control means for controlling the scanning position of at least either of two scanning means; furthermore, in the case when an entirely new optical element or a laser light source having a different wavelength, for which correction information is not stored, is adopted, the laser scanning microscope does not function unless the new correction information is registered.

BRIEF SUMMARY OF THE INVENTION

In addressing the above issues, an inventive laser scanning microscope is herein presented of which any optical element is not required to be replaced, and the ease of operation and the positioning repeatability of light stimulation are improved.

The present invention provides the following means. A laser scanning microscope according to a first aspect of the present invention includes an exciting observation light source emitting exciting observation light, a stimulation light source emitting stimulation light, a first scanning portion that two-dimensionally scans the exciting observation light emitted from the exciting observation light source across a specimen, a second scanning portion that sets a two-dimensional position on the specimen to which the stimulation light emitted from the stimulation light source is irradiated, an optical path combining portion that brings the exciting observation light scanned by the first scanning portion and the stimulation light positioned by the second scanning portion to an identical optical path, an objective lens that irradiates the specimen with the exciting observation light and/or the stimulation light passed through the optical path combining portion and also converges fluorescence light emitted from the specimen, and a detecting portion that detects the fluorescence light converged by the objective lens, the optical path combining portion being disposed so as to be in an optically conjugate relationship with the first scanning portion and the second scanning portion.

According to the first aspect of the present invention, the exciting observation light emitted from the exciting observation light source is two-dimensionally scanned by the first scanning portion, and is irradiated on the specimen through the objective lens; a fluorescence substance in the specimen is thereby excited to cause the specimen to emit the fluorescence light. The fluorescence light emitted from the specimen is converged by the objective lens, and then detected by the detecting portion. A fluorescence image of the specimen can be obtained by correlating the intensity of the fluorescence light detected by the detecting portion with the position of the exciting observation light scanned by the first scanning portion on the specimen.

On the other hand, the stimulation light emitted from the stimulation light source is irradiated on the specimen via the second scanning portion and the objective lens, and stimulates a specified point on the specimen that is adjusted by the second scanning portion. The exciting observation light and the stimulation light are brought to an identical optical path by operation of the optical path combining portion so as to be irradiated on the specimen through the identical objective lens.

According to the first aspect of the present invention, the optical path combining portion is disposed so as to be in an optically conjugate relationship with the first scanning portion and the second scanning portion; therefore, even when a pencil of light is deflected by the first and second scanning portions, the respective incident points of the exciting observation light and the stimulation light on the optical path combining portion remain unchanged. That is, the incident areas of the exciting observation light and the stimulation light on the optical path combining portion can be respectively fixed. As the result, it becomes possible to separate the incident areas of the exciting observation light and the stimulation light on the optical path combining portion, and to use an optical element having no wavelength dependence. According to the present invention, the optical path combining portion can be used without being replaced even when the wavelength of the exciting observation light or the stimulation light is changed due to light source switching or the like, and therefore the ease of operation and the repeatability of positioning light stimulation can be easily improved.

In the above first aspect of the present invention, it is preferable that the optical path combining portion is composed of an optical element having no wavelength dependence. With this configuration, the optical path combining portion can be used without being replaced even when the wavelength of the exciting observation light or the stimulation light is changed due to light source switching or the like, and therefore the ease of operation and the repeatability of positioning light stimulation can be easily improved.

In the above first aspect of the present invention, it is possible to install an incident-area setting portion between the stimulation light source and the optical path combining portion, the incident-area setting portion setting an incident area of the stimulation light on the optical path combining portion, being different from the incident area of the exciting observation light. By this arrangement, the respective incident areas of the exciting observation light and the stimulation light on the optical path combining portion can be separated, which enables the exciting observation light, the stimulation light, and the fluorescence light to be utilized without being wasted. As the result, high-brightness light stimulation can be implemented, and a sharp fluorescence image can be obtained by effectively detecting feeble fluorescence light emitted from the specimen.

Further, in the above first aspect of the present invention, the incident-area setting portion may set an incident area of the stimulation light at the outside of the incident area of the exciting observation light on the optical path combining portion. By this arrangement, it becomes possible to allow the central portion of the pencil of the exciting observation light and the fluorescence light, having relatively high brightness according to Gaussian distribution, to be brought to the incident area; thereby, a bright fluorescence image can be obtained. Simultaneously, it is also becomes possible to apply light stimulation to a further small area because the stimulation light passes through a large aperture.

Also, in the above first aspect of the present invention, the incident-area setting portion may set an incident area of the stimulation light at the inside of the incident area of the exciting observation light on the optical path combining portion. By this arrangement, the stimulation light passed through a small aperture is converged to the specimen, and therefore it becomes possible to irradiate the specimen with the stimulation light that does not spread along the direction of the optical axis; light stimulation being uniform in the depth direction can be thereby implemented.

In the above first aspect of the present invention, axicon prisms or diffraction optical elements can be used as the incident-area setting portion. Further, in the first aspect of the present invention, a mirror member having a ring-shaped reflective area and a transmitting area provided inside thereof can be employed as the optical path combining portion. Also, in the first aspect of the present invention, a mirror member having a ring-shaped transmitting area and a reflective area provided inside thereof can be employed as the optical path combining portion.

In the above first aspect of the present invention, it is possible to use a device consisting of a plurality of optical elements disposed in a matrix form as the optical path combining portion, the optical elements changing their reflection characteristics according to an electrical signal. By this arrangement, it becomes possible to change their reflection characteristics by switching the electrical signal, and to reflect the exciting observation light or the stimulation light at the respective incident areas toward the objective lens.

In the above first aspect of the present invention, a digital micromirror device (trade name) can also be used as the optical path combining portion. In this case, it becomes possible to reflect the exciting observation light and the stimulation light incident to different areas on the optical path combining portion toward the objective lens by changing the respective angles of minute micromirrors disposed in a matrix form. In the above first aspect of the present invention, a reflective member being divided into a plurality of areas having different surface reflectivities each other can be used as the optical path combining portion. In the above first aspect of the present invention, the plurality of areas of the reflective member can be composed of two regions: High-reflectivity region having a reflectivity of substantially 100% and high-transmittivity region having a reflectivity of substantially zero. Further, in the above first aspect of the present invention, the reflective member can be divided into a plurality of areas concentrically laid out with respect to the optical axis of the device (the optical axis of the laser scanning microscope).

Next, a second aspect of the present invention provides a laser scanning microscope including an exciting observation light source emitting exciting observation light, a stimulation light source emitting stimulation light, a first scanning portion that two-dimensionally scans the exciting observation light emitted from the exciting observation light source across a specimen, a second scanning portion that sets a two-dimensional position on the specimen to which the stimulation light emitted from the stimulation light source is irradiated, an optical path combining portion that brings the exciting observation light scanned by the first scanning portion and the stimulation light positioned by the second scanning portion to an identical optical path, an objective lens that irradiates the specimen with the exciting observation light and/or the stimulation light passed through the optical path combining portion and also converges fluorescence light emitted from the specimen, and a detecting portion that detects the fluorescence light converged by the objective lens, the optical path combining portion being composed of optical elements having no wavelength dependence.

According to the second aspect of the present invention, the optical path combining portion can be used, since having no wavelength dependence, without being replaced even when the wavelength of the exciting observation light or the stimulation light is changed due to light source switching or the like, and therefore the ease of operation and repeatability of positioning light stimulation can be easily improved. In the above second aspect of the present invention, a polarizing beam splitter can also be used as the optical path combining portion. Further, in the above second aspect of the present invention, the optical path combining portion can be a reflective member that is divided into a plurality of areas having different surface reflectivities each other, and is disposed so as to be in an optically conjugate relationship with the first scanning portion and the second scanning portion. In the above second aspect of the present invention, the plurality of areas of the reflective member can be composed of two regions: High-reflectivity region having a reflectivity of substantially 100% and high-transmittivity region having a reflectivity of substantially zero. Further, in the above aspect of the present invention, the plurality of areas of the reflective member can be concentrically laid out with respect to the optical axis of the device (the optical axis of the laser scanning microscope).

According to the present invention, it becomes unnecessary to replace the optical element, and the ease of operation and the repeatability of positioning light stimulation can be improved.

DETAILED DESCRIPTION OF THE INVENTION

Figure 1:
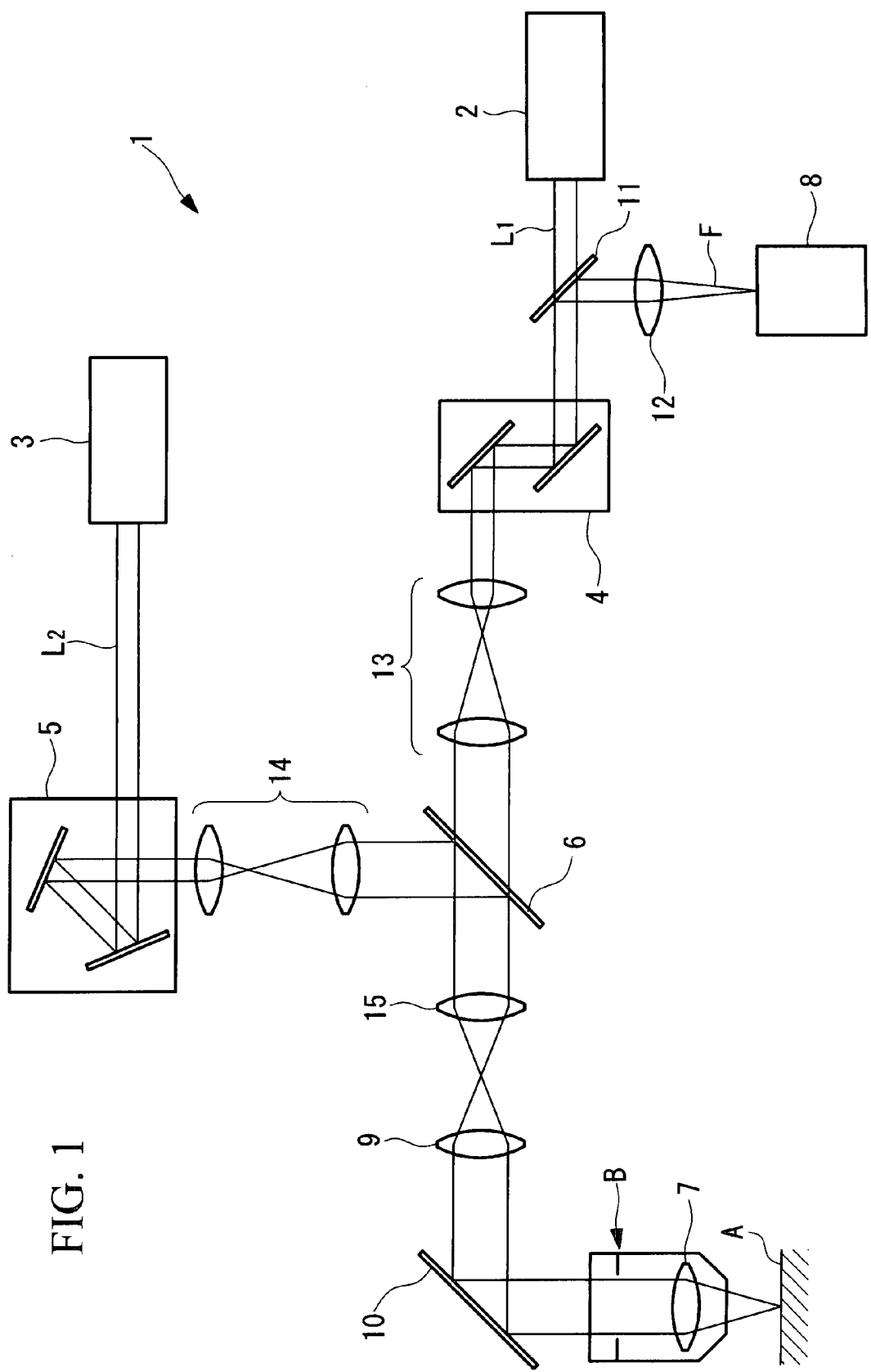
FIG. 1 shows a general configuration of a laser scanning microscope according to a first aspect of the present invention.

A laser scanning microscope according to a first embodiment of the present invention will now be described with reference to the drawings, FIGS. 1 to 4. A laser scanning microscope 1 according to this embodiment includes, as shown in FIG. 1, an exciting observation light source 2 emitting exciting observation light L1, a stimulation light source 3 emitting stimulation light L2, a first scanning portion 4 that two-dimensionally scans the exciting observation light L1 on a specimen A, a second scanning portion 5 that sets a two-dimensional position on the specimen A to which the stimulation light L2 is irradiated, an optical path combining portion 6 that brings the exciting observation light L1 and the stimulation light L2 to an identical optical path, an objective lens 7 that converges the exciting observation light L1 and/or the stimulation light L2 passed through the optical path combining portion 6 to irradiate the specimen A, and also collects fluorescence light F emitted from the specimen A, and a detecting portion 8 that detects the fluorescence light F collected by the objective lens 7. In the figures, reference numeral 9 denotes an imaging lens, 10 denotes a mirror, 11 denotes a dichroic mirror, and 12 denotes a converging lens. The detecting portion 8 includes a confocal opening (pinhole) disposed at the focal point of the converging lens 12 for performing confocal detection, and an optical detector for performing optoelectronic conversion of the light being passed through the confocal opening.

Figure 2:
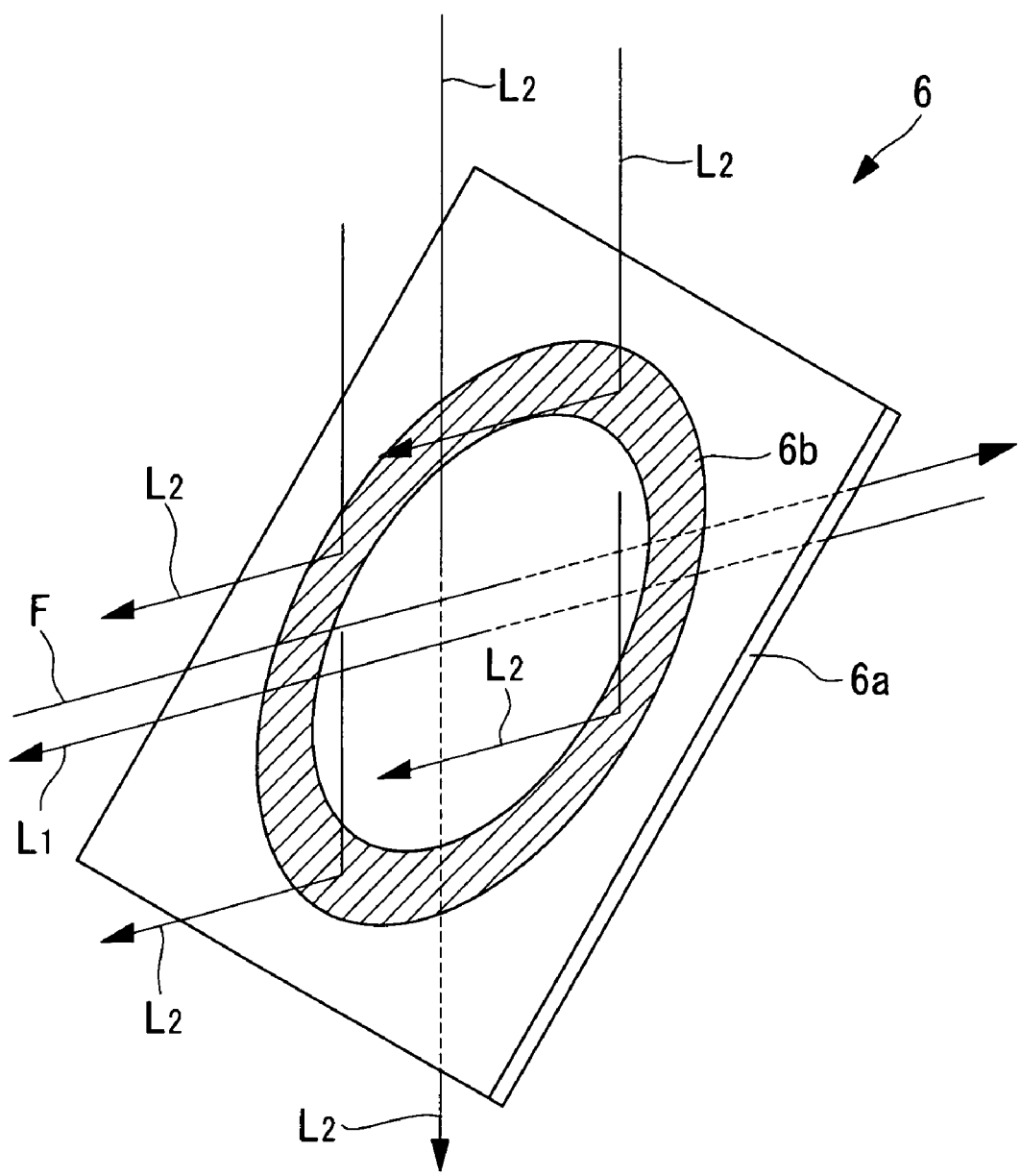
FIG. 2 is a perspective view showing an example of the optical path combining portion of the laser scanning microscope illustrated in FIG. 1.

The first and second scanning portions 4, 5 respectively deflect light beams being incident at arbitrary angles, and the directions along which the first and second portions 4, 5 respectively deflect the incident light beams orthogonally intersect to each other. Each of the first and second scanning portions 4, 5 being constituted by, for example, a galvanometer mirror. The optical path combining portion 6 is, for example, a transparent glass plate 6a of which a particular surface area is coated with a reflective film 6b, as shown in FIG. 2. Since the reflective film 6b has no wavelength dependence, almost all of the light incident to the area (high-reflective area) where the reflective film 6b is coated, regardless of its wavelength, is reflected. Conversely, almost all of the light incident to the other area (high-transmittance area) where the reflective film 6b is not coated, regardless of its wavelength, is transmitted through the glass plate that also has no wavelength dependence.

In the case exemplified in FIG. 2, the reflective film 6b is coated in an annular shape on one side of the transparent glass plate 6a. If the optical path combining portion 6 is disposed, for example, at an angle of 45° with respect to respective optical axes of the exciting observation light L1 and the stimulation light L2 which intersect to each other, the stimulation light L2 incident to the optical path combining portion 6 from the side where the reflective film 6b is coated, is reflected at a deflection angle of 90° in the area covered with the reflective film 6b, while the stimulation light L2 incident to the other area is transmitted through the transparent glass plate 6a.

The exciting observation light L1 is incident on the optical path combining portion 6 from the side opposite to the side where the reflective film 6b is coated, is transmitted through the area of the transparent glass plate 6a where the reflective film 6b is not coated, and is brought to the same optical path as the stimulation light L2. Furthermore, the fluorescence light that returns from the specimen A is also transmitted through the area of the transparent glass plate 6a where the reflective film 6b is not coated, and travels along the same optical path as the exciting observation light L1.

In the laser scanning microscope 1 according to this embodiment, first relay lenses 13 are disposed between the first scanning portion 4 and the optical path combining portion 6, second relay lenses 14 are disposed between the second scanning portion 5 and the optical path combining portion 6, and a third relay lens 15 is disposed between the optical path combining portion 6 and an image formation lens 9; thereby the first scanning portion 4, the second scanning portion 5, the optical path combining portion 6, and a pupil B of the objective lens 7 are all positioned in an optically conjugate relationship with each other.

Figure 3:
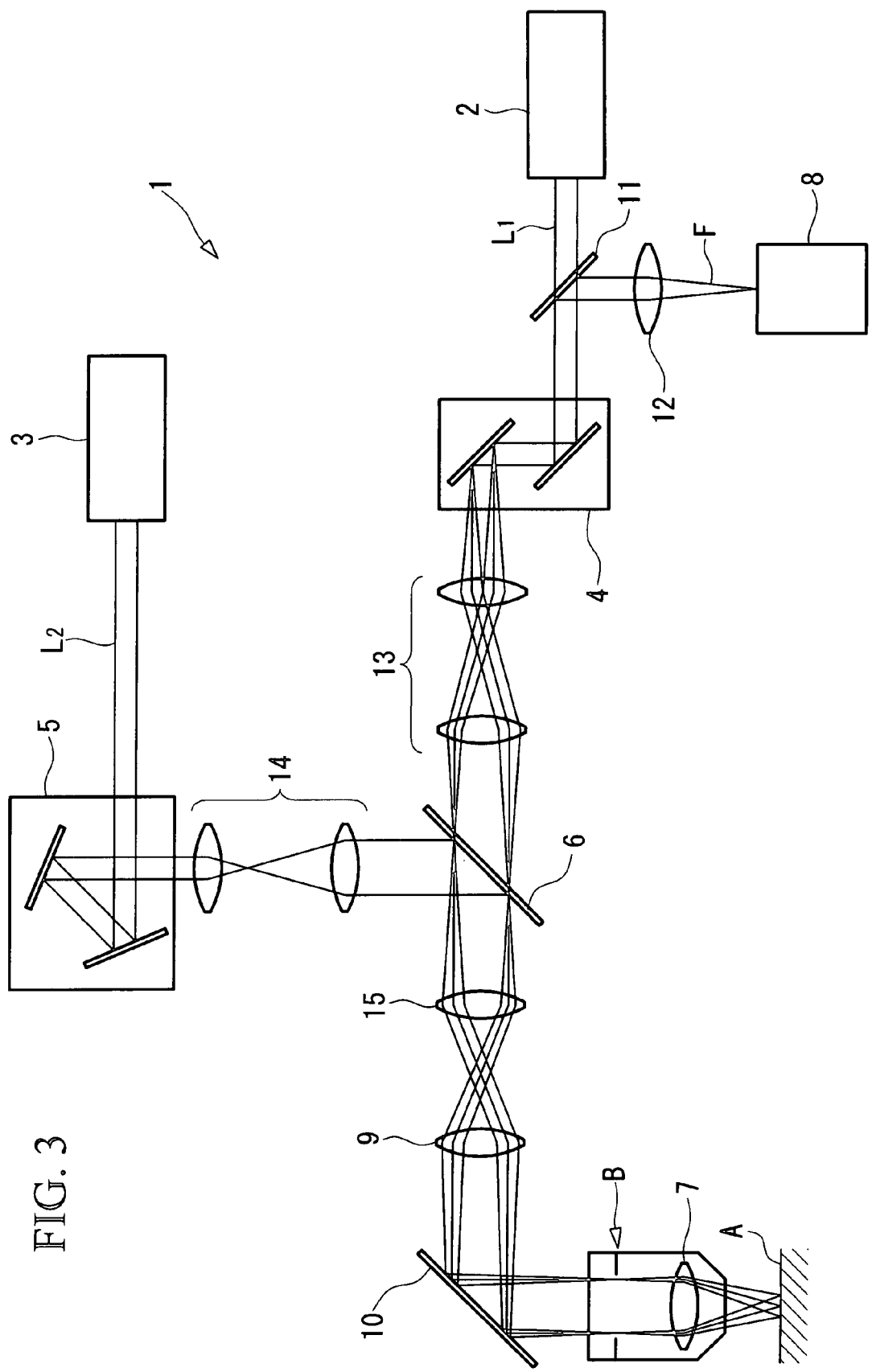
FIG. 3 illustrates optical paths of exciting observation light of the laser scanning microscope illustrated in FIG. 1.

That is, as shown in FIG. 3, as the first scanning portion 4 is actuated, the reflection angle of the exciting observation light L1 is changed and the irradiation position of the exciting observation light L1 is two-dimensionally moved on the specimen A. At that time, because the first scanning portion 4, the optical path combining portion 6, and the pupil B of the objective lens 7 are disposed in an optically conjugate relationship with each other, the exciting observation light L1 is consistently incident, regardless of the angle of the exciting observation light L1 changed by the first scanning portion 4, on the same point of each of the first scanning portion 4, the optical path combining portion 6, and the pupil B of the objective lens 7.

Figure 4:
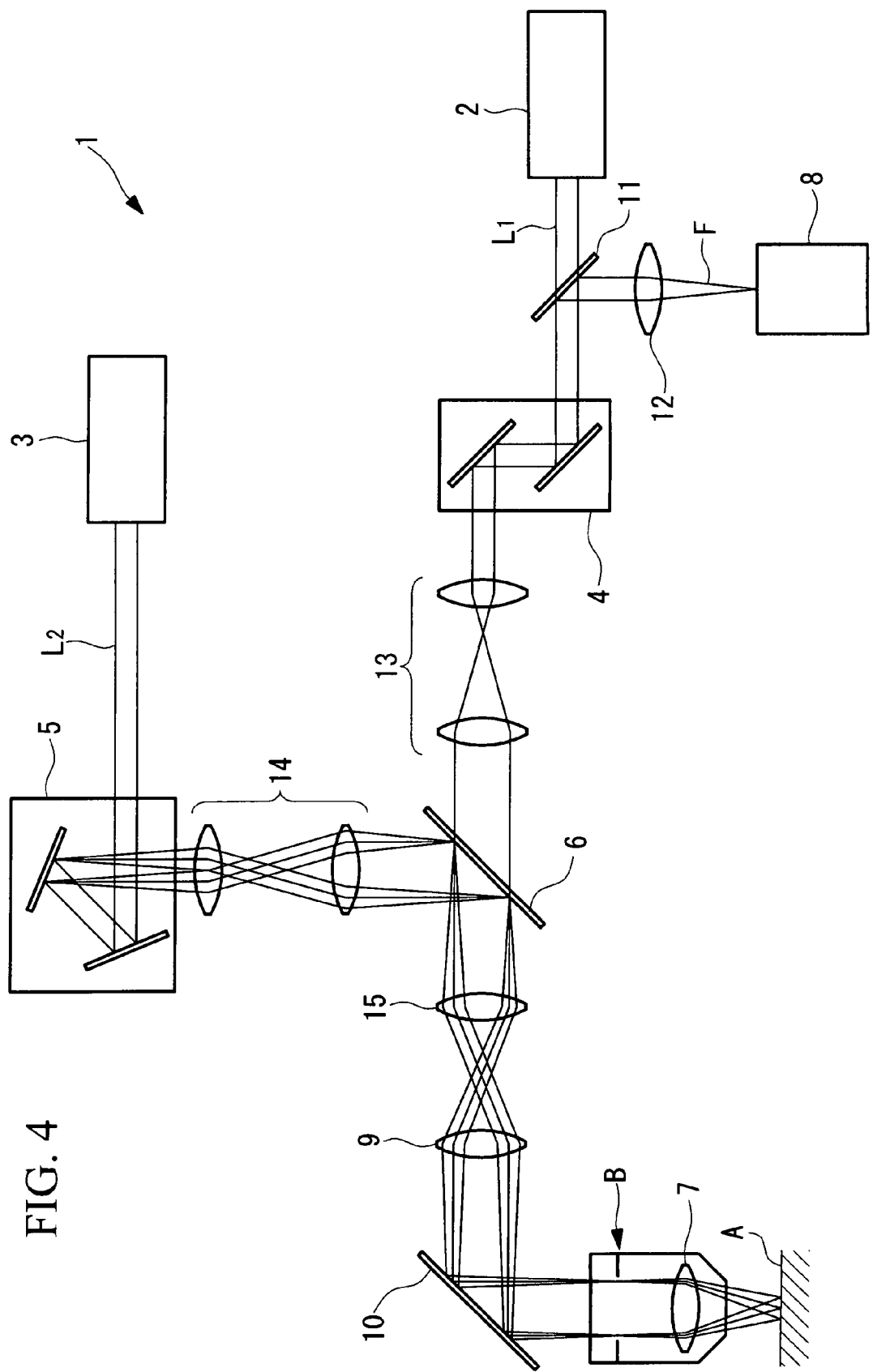
FIG. 4 illustrates optical paths of stimulation light of the laser scanning microscope illustrated in FIG. 1.

Similarly, as shown in FIG. 4, as the second scanning portion 5 is actuated, the angle of the stimulation light L2 is changed and the irradiation position of the stimulation light L2 is two-dimensionally moved on the specimen A. At that time, because the second scanning portion 5, the optical path combining portion 6, and the pupil B of the objective lens 7 are disposed in an optically conjugate relationship with each other, the stimulation light L2 is consistently incident, regardless of the angle of the stimulation light L2 changed by the second scanning portion 5, on the same point of each of the second scanning portion 5, the optical path combining portion 6, and the pupil B of the objective lens 7.

A function of the laser scanning microscope 1 structured as above according to this embodiment will be described below. In order to perform a fluorescence observation of the specimen A using the laser scanning microscope 1 according to this embodiment, the exciting observation light L1 is radiated by activating the exciting observation light source 2 and two-dimensionally scanned by means of the first scanning portion 4. The exciting observation light L1 travels through the first relay lenses 13, the optical path combining portion 6, the third relay lens 15, and the image formation lens 9; then the exciting observation light L1 is delivered to the objective lens 7 by the mirror 10 and converged thereby into a point-like spot on the specimen A.

On the specimen A, the fluorescence light F is emitted by irradiation with the exciting observation light L1. The emitted fluorescence light F is collected by the objective lens 7 and returns though the mirror 10, the image formation lens 9, the first relay lenses 13, and the first scanning portion 4. The fluorescence light F is divided from the exciting observation light L1 by the dichroic mirror 11 after passing through the first scanning portion 4, converged by the converging lens 12, and detected by the detecting portion 8. A two-dimensional fluorescence image of the specimen A can be obtained by associating a record of results obtained by the detecting portion 8 with the positions on the specimen A scanned by the first scanning portion 4.

Further, in order to apply light stimulation on the specimen A using the laser scanning microscope 1 according to this embodiment, the stimulation light L2 is radiated by activating the stimulation light source 3 and the two-dimensional position on the specimen A to which the stimulation light L2 is irradiated is adjusted with the second scanning portion 5. The stimulation light L2 travels through the second relay lenses 14, the optical path combining portion 6, the third relay lens 15, and the image formation lens 9; then the stimulation light L2 is delivered to the objective lens 7 by the mirror 10 and converged thereby into a point-like spot on the specimen A. It thus becomes possible to perform light stimulation at the point or the micro-area on the specimen A to which the stimulation light L2 is irradiated.

In the laser scanning microscope 1 according to this embodiment, the exciting observation light L1 and the stimulation light L2 are brought to an identical optical path by the optical path combining portion 6, and can thereby be irradiated on the same specimen A at the same time or at different times. Furthermore, it becomes possible to obtain a fluorescence image of the specimen A by two-dimensionally scanning a desired area with a spot light of the exciting observation light L1 in parallel with applying light stimulation to a desired point or area by means of the stimulation light L2, if an area irradiated with the exciting observation light L1 is defined by the first scanning portion 4 and a point or area irradiated with the stimulation light L2 is defined by the second scanning portion 5, respectively, as desired.

In this case, because the optical path combining portion 6 of the laser scanning microscope 1 according to this embodiment has no wavelength dependence, it is possible to use the laser scanning microscope 1 in common for the exciting observation light L1 and the stimulation light L2 having any wavelength without replacing the optical path combining portion 6, even when the wavelength of the exciting observation light L1 or the stimulation light L2 is changed by replacement or the like of the exciting observation light source 2 or stimulation light source 3. As a result, a fluctuation in the optical path at the reflective surface of the optical path combining portion 6 is precluded, and it becomes unnecessary to correct the incident positions of the exciting observation light L1 and the stimulation light L2 with the first and second scanning portions 4, 5; the optical configuration can thereby be simplified.

It is also possible to accurately irradiate a desired position on the specimen A with the exciting observation light L1 and the stimulation light L2 respectively without correcting the irradiation positions even when the wavelength of each of the exciting observation light L1 and the stimulation light L2 is changed. Since the optical paths are combined on the specimen side of each of the two scanning portions, the respective scanning portions can independently function without affecting to each other. Furthermore, the optical path of the stimulation light L2 is combined with the optical path of both the exciting observation light L1 traveling toward the specimen A and the fluorescence light L returning from the specimen A as observation light by the optical path combining portion 6 which is located in the common optical path, so the optical configuration becomes simplified.

Especially in the laser scanning microscope 1 according to this embodiment, the irradiating area of the stimulation light L2 on the optical path combining portion 6 does not vary regardless of actuation conditions of the second scanning portion 5, because the second scanning portion 5 and the optical path combining portion 6 are disposed so as to be optically conjugate with each other. Therefore, once the second scanning portion 5 is adjusted so that the stimulation light L2 emitted from the stimulation light source 3 is incident on the area of the optical path combining portion 6 where the reflective film 6b is annularly coated, even when the irradiation position on the specimen A is changed by the second scanning portion 5, the stimulation light L2 is not incident outside the area where the reflective film 6b is coated; consequently the stimulation light L2 incident on the reflective film 6b is surely reflected thereat and irradiated on the specimen A.

Also in the laser scanning microscope 1 according to this embodiment, the irradiating area of the exciting observation light L1 and the incident area of the fluorescence light F from the specimen A on the optical path combining portion 6 do not vary, regardless of actuation conditions of the first scanning portion 4, because the first scanning portion 4 and the optical path combining portion 6 are disposed so as to be optically conjugate with each other. Therefore, once the first scanning portion 4 is adjusted so that the exciting observation light L1 emitted from the exciting observation light source 2 is incident on the internal area of the reflective film 6b of the optical path combining portion 6, even when the irradiation position on the specimen A is changed by the first scanning portion 4 the exciting observation light L1 is not incident outside of the internal area of the reflective film 6b; consequently the exciting observation light L1 incident on the internal area of the reflective film 6b is surely transmitted therethrough and irradiated on the specimen A.

That is, in the laser scanning microscope 1 according to this embodiment, it becomes possible that all the exciting observation light L1 emitted from the exciting observation light source 2 is incident on the specimen A and most of the fluorescence light F returned from the specimen A is detected by limiting the incident area of the exciting observation light L1 to the internal area of the reflective film 6b. As a result, an advantage is brought about that a bright fluorescence image can be obtained.

It is noted that although the optical path combining portion 6 having the annularly coated reflective film 6b is employed in the laser scanning microscope 1 according to this embodiment, another type of optical path combining portion 6 having a reflective film 6b circularly coated may be employed instead; wherein the exciting observation light L1 and the fluorescence light F are transmitted through an area outside of the circular reflective film 6b. Furthermore, an arbitrary shape of the reflective film 6b may be employed as long as it is partly disposed within the incident areas of both the exciting observation light L1 and the stimulation light L2, and reflects either of the exciting observation light L1 or the stimulation light L2. It is also possible that the exciting observation light L1 and the fluorescence light F are reflected by the reflective film 6b so as to be incident along the same optical path as the stimulation light L2.

It is also noted that although the optical path combining portion 6 having the reflective film 6b partly coated is exemplified in this embodiment, a half mirror having no reflective film 6b or a polarizing beam splitter may be employed instead, the polarizing beam splitter allowing a light having specified polarization conditions to be transmitted. Since those optical elements have no wavelength dependence, they are not required to be replaced even when the wavelength is changed.

The polarizing beam splitter is used by arranging it so that the respective deflection directions of the exciting observation light L1 and the stimulation light L2 incident thereon become different to each other. In this case, it is also preferable to employ, as the exciting observation light L1, ultrashort-pulse laser light that exerts a multiphoton excitation effect, and to detect the fluorescence light F by separating it before being returned to the polarizing beam splitter; thereby light amount loss of the fluorescence light F due to the polarizing beam splitter can be avoided. In the case that the exciting observation light L1 and the stimulation light L2 are combined through the use of a difference in the polarization directions of laser light, it is not necessary to dispose the polarizing beam splitter, used as the optical path combining portion 6, at the position conjugate with the pupil B of the objective lens.

Figure 5:
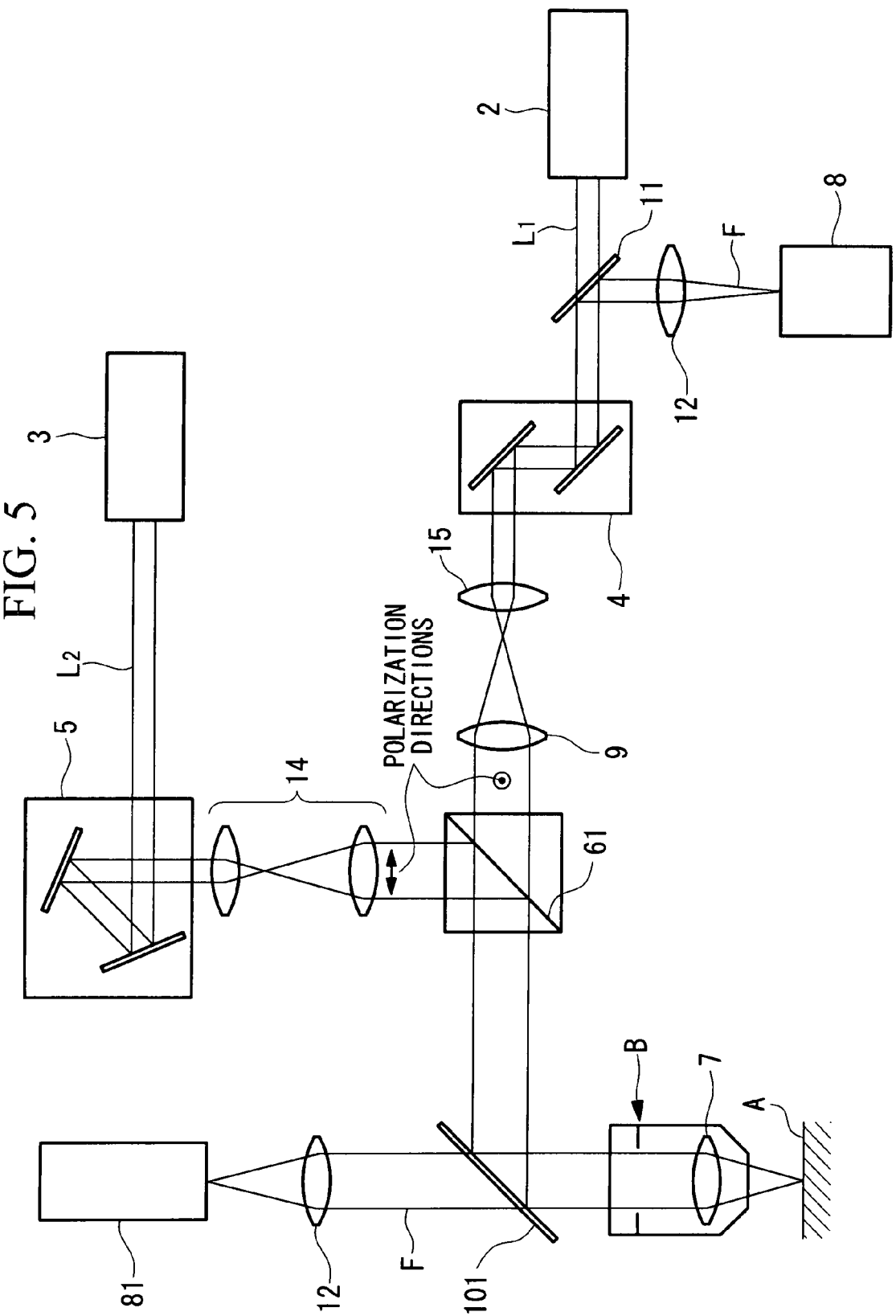
FIG. 5 shows another general configuration of a laser scanning microscope according to the first aspect of the present invention.
Figure 6:
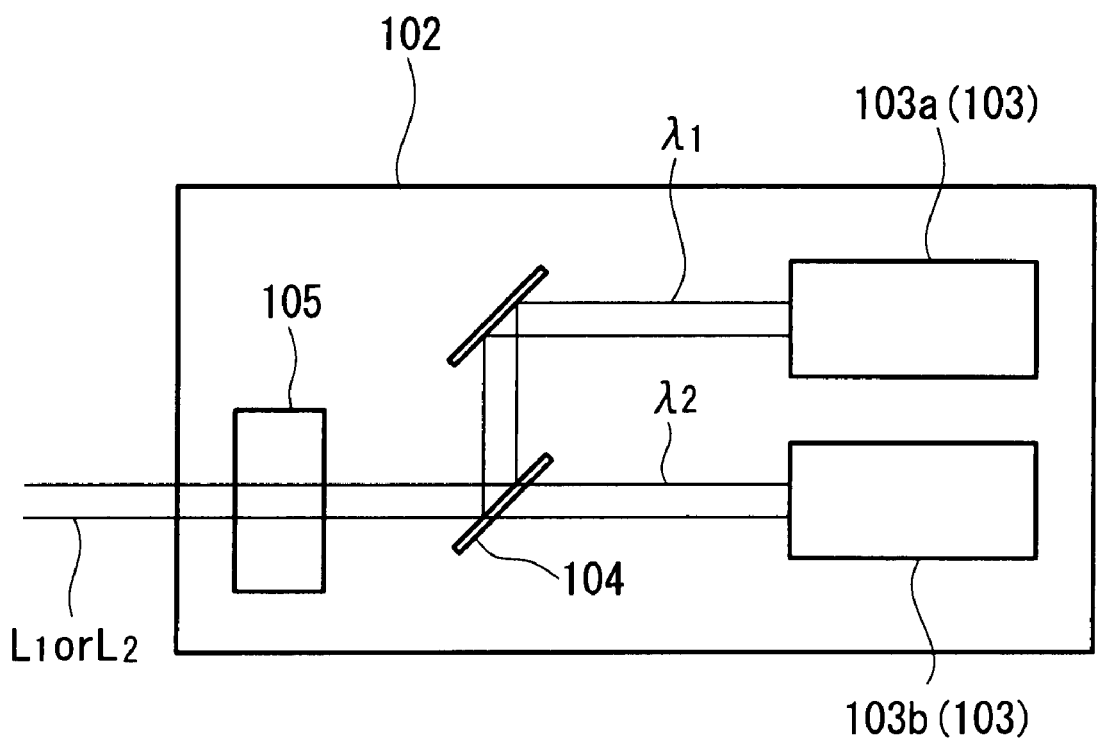
FIG. 6 shows a partial configuration of a laser scanning microscope according to the first aspect of the present invention.

An example of such a configuration is shown in FIG. 5. In the configuration exemplified in FIG. 5, compared with the example shown in FIG. 1, an ultrashort-pulse laser light source is used as the exciting observation light source 2, the relay lenses 13 are omitted, and the polarizing beam splitter 61 for combining optical paths is disposed on the specimen A side of the image formation lens 9. A dichroic mirror 101 is also disposed between the objective lens 7 and the image formation lens 9 instead of the mirror 10. Furthermore, the converging lens 12 and a non-descan type detecting portion 81 are disposed on the side of the dichroic mirror 101 opposite to the objective lens 7, the non-descan type detecting portion 81 detecting the light converged by the converging lens 12; thereby, the fluorescence light F, which is detecting light returned from the specimen A, is not returned to the first scanning portion 4, but directed to the non-descan type detecting portion 81. Because the non-descan type detecting portion 81 is not provided with a confocal opening, the light returned from the specimen A is all detected by the non-descan type detecting portion 81. The multiphoton excitation effect, however, occurs only near the converging position of the exciting light, so it is possible to obtain optical information on the cross-sectional layers of the specimen A from the detection results of the non-descan type detecting portion 81. It is noted that although the detecting portion 8 remains in the configuration exemplified in FIG. 5, the detecting portion 8 may be omitted. When the detecting portion 8 remains, the fluorescence light F may be detected by the detecting portion 8 via the mirror 10 that is replaced with the dichroic mirror 101. Next, an example of a laser light source unit 102 configured to be used as either or both of the exciting observation light source 2 and the stimulation light source 3 is shown in FIG. 6. The laser light source unit 102 is configured so as to combine laser light having different wavelengths, emitted from a plurality of laser light sources 103, into a pencil of light using an optical system such as the dichroic mirror 101 and the like, and then to perform wavelength selection or intensity adjustment by use of an AOTF (Acoust-Optic Tunable Filter) 105. In the configuration exemplified in FIG. 6, a first laser light source 103a and second laser light source 103b are provided as the laser light sources 103. By using the laser light source unit 102 configured as exemplified, laser light having desired intensity and also a desired wavelength can be provided. Since the optical path combining portion 6 used for the laser scanning microscope 1 of the present invention has no wavelength dependence, it is possible to freely change the laser wavelength of the exciting observation light L1 or the stimulation light L2 by using the laser light source unit 102 as either or both of the exciting observation light source 2 and the stimulation light source 3. Therefore, it is desirable to employ the laser light source unit 102, as shown in FIG. 6, as either or both of the exciting observation light source 2 and the stimulation light source 3, in the configurations exemplified in FIGS. 1, 3, 4, 5, and also FIGS. 7 and 12 described later.

Figure 8:
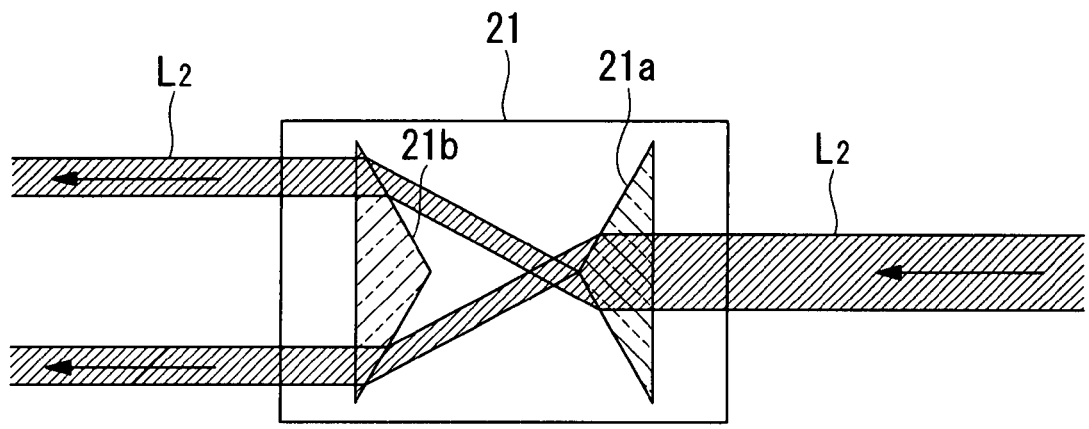
FIG. 8 is a partial vertical sectional view exemplarily showing the incident-area setting portion of the laser scanning microscope illustrated in FIG. 7.
Figure 9:
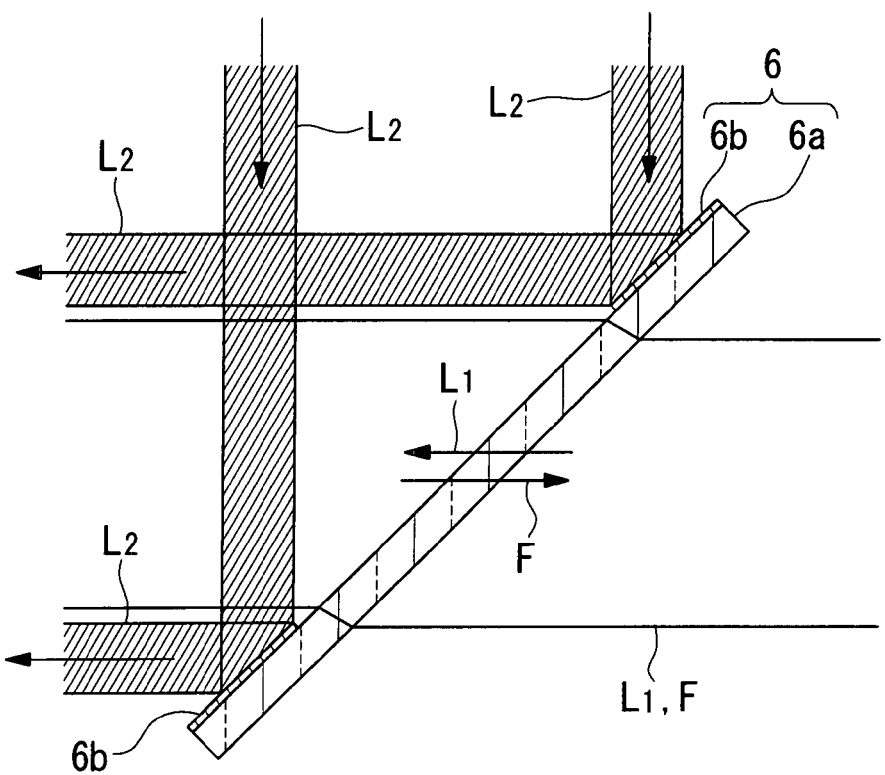
FIG. 9 is a magnified sectional view showing the optical path combining portion of the laser scanning microscope illustrated in FIG. 1.

Next, a laser scanning microscope 20 according to a second embodiment of the present invention will be described with reference to FIGS. 7 to 9. In the description of this embodiment, the same constituents as those of the laser scanning microscope 1 according the first embodiment are respectively denoted with the same reference numeral, and the explanation thereof is omitted.

Figure 7:
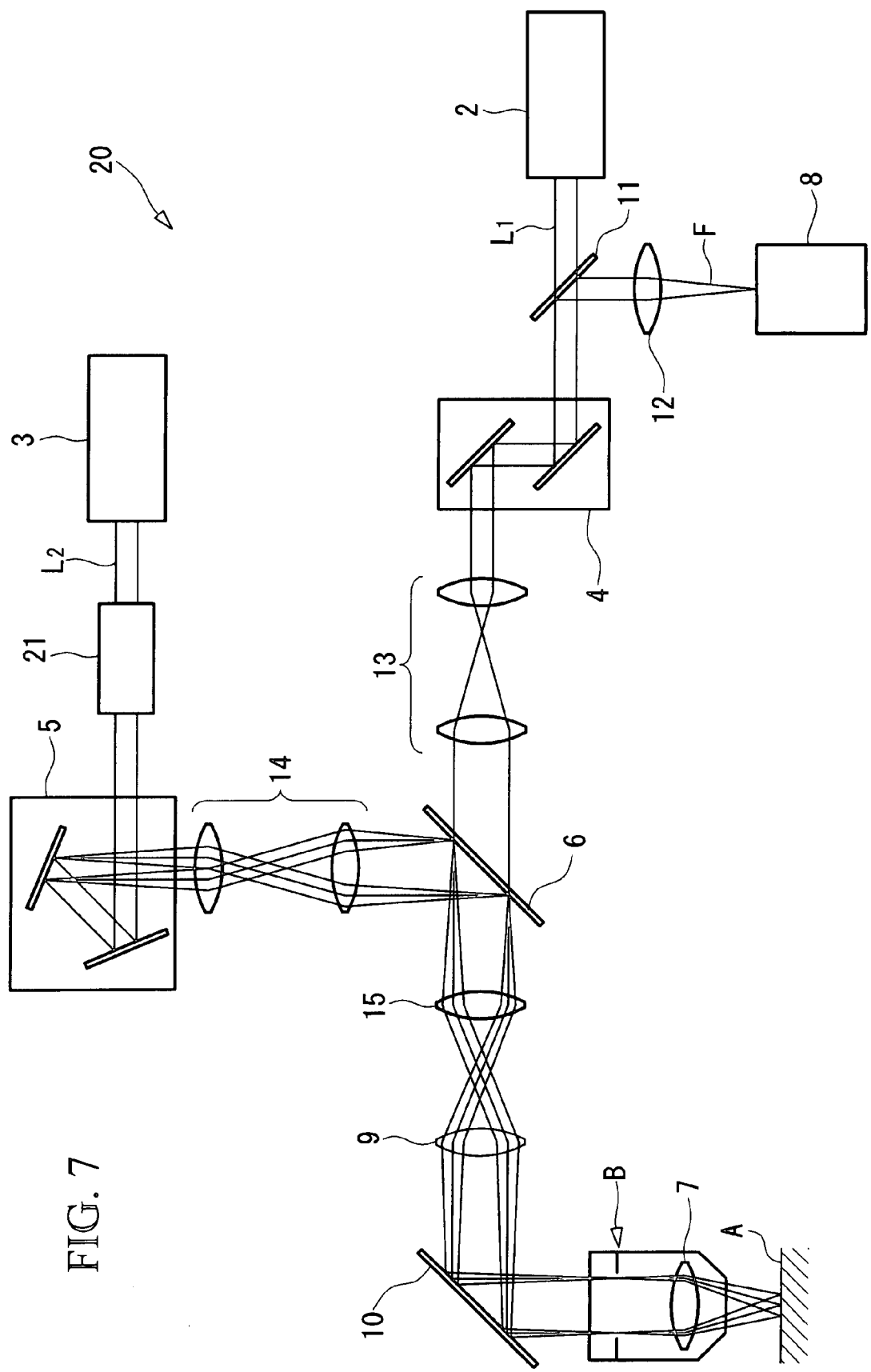
FIG. 7 shows a general configuration of a laser scanning microscope according to a second aspect of the present invention.

The laser scanning microscope 20 according to this embodiment is different from the laser scanning microscope 1 according to a first embodiment, as shown in FIG. 7, in the point that it is equipped with an incident-area setting portion 21 between the stimulation light source 3 and the second scanning portion 5. The incident-area setting portion 21 is constituted by, for example, a pair of cone-shaped prisms (so called axicon prisms) 21a, 21b which are arranged so that apexes thereof are opposed.

By using the axicon prisms, a column-shaped pencil of the stimulation light L2 incident to one of the prisms 21a is shaped into a hollow cylinder-shaped pencil when emitted from the other prism 21b. It thereby becomes possible to make the stimulation light L2 incident only on the reflective film 6b provided in the optical path combining portion 6 and all reflected toward the specimen A, as shown in FIG. 9. As a result, the stimulation light L2 having high intensity without being wasted can be irradiated onto the specimen A for light stimulation thereof.

Furthermore, the hollow cylinder-shaped pencil of the stimulation light L2 shaped through axicon prisms has high intensity at its outer region and abruptly lose the intensity at the outside of the region. Consequently, with a pencil of the stimulation light L2 having the diameter substantially equal to that of the pupil of the objective lens 7, the maximum numerical aperture of the objective lens 7 can be utilized when the stimulation light L2 is emitted therefrom, and the radiation spot on the specimen A is made small.

Figure 10:
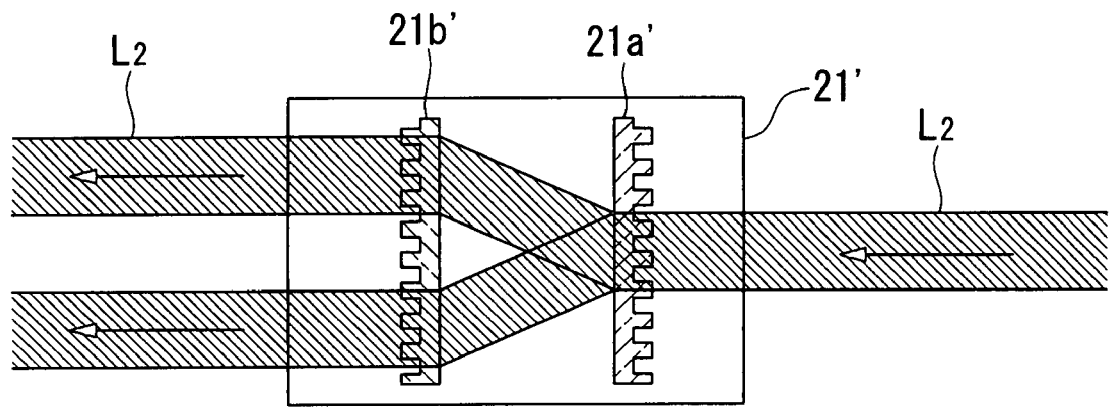
FIG. 10 is a vertical sectional view showing an alternative configuration of the incident-area setting portion illustrated in FIG. 8.

It is noted that although the axicon prisms are employed as the incident-area setting portion 21 in this embodiment, a pair of diffraction optical elements 21a', 21b' may be used instead thereof as shown in FIG. 10. By using such an incident-area setting portion 21', a column-shaped pencil can also be shaped into a hollow cylinder-shaped pencil; that is, a similar result as obtained with the axicon prisms is obtained. In the case using the diffraction optical elements 21a', 21b', the light intensity distribution, that is Gaussian distribution, of the pencil can be maintained through the shaping process, which brings about an advantage that an Airy disc of the stimulation light L2 is prevented from being produced in proximity to the radiation spot and therefore light stimulation of an undesirable part on the specimen A is avoided.

Figure 11:
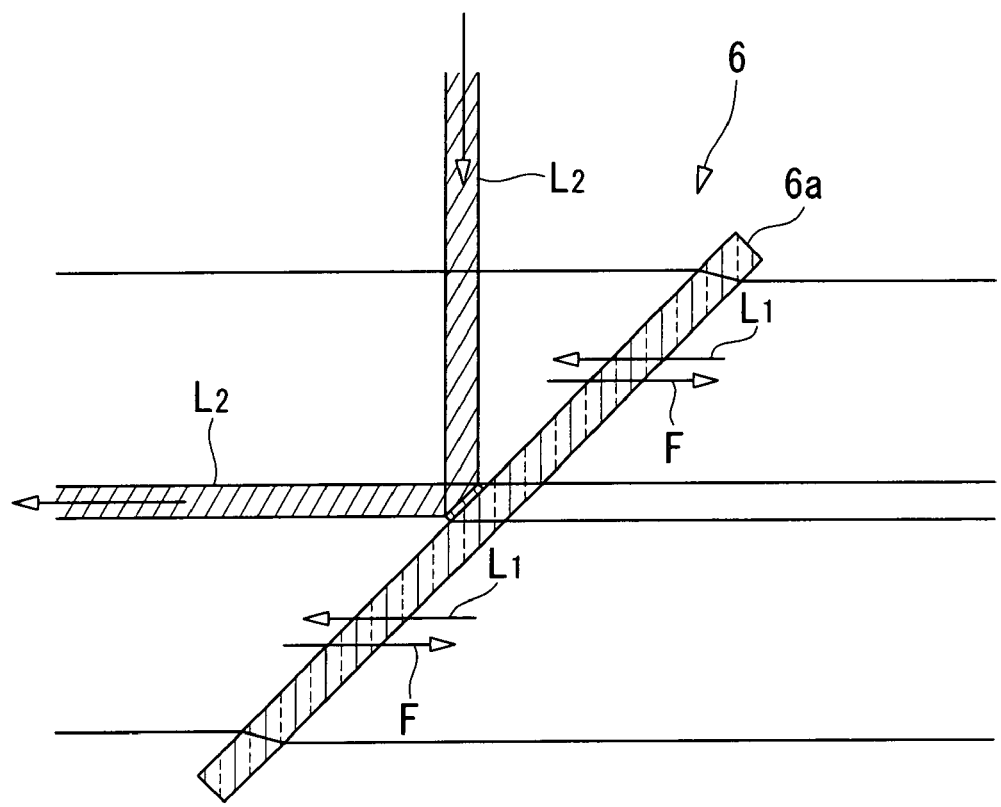
FIG. 11 is a magnified sectional view showing an alternative configuration of the optical path combining portion in FIG. 1.

It is also noted that although a column-shaped pencil is shaped into a hollow cylinder-shaped pencil through the axicon prisms used for the incident-area setting portion 21 in this embodiment, the stimulation light L2 may be shaped into a very slender pencil by using a beam expander (not shown). In this case, it would be desirable to limit the area for coating the reflective film 6b to a very small spot substantially in the center of the optical path combining portion 6, as shown in FIG. 11.

By this arrangement, the stimulation light L2 shaped into a very slender pencil is converged by the objective lens 7 and irradiated on the specimen A; therefore, the aperture of the objective lens 7 is narrowed when the stimulation light L2 is emitted therefrom, and it becomes possible to irradiate the specimen A with the stimulation light L2 that does not spread along the direction of the optical axis. Since the size of the light stimulation spot depending the depth in the specimen A does not vary, light stimulation adaptable to three-dimensional observation can be provided.

Figure 12:
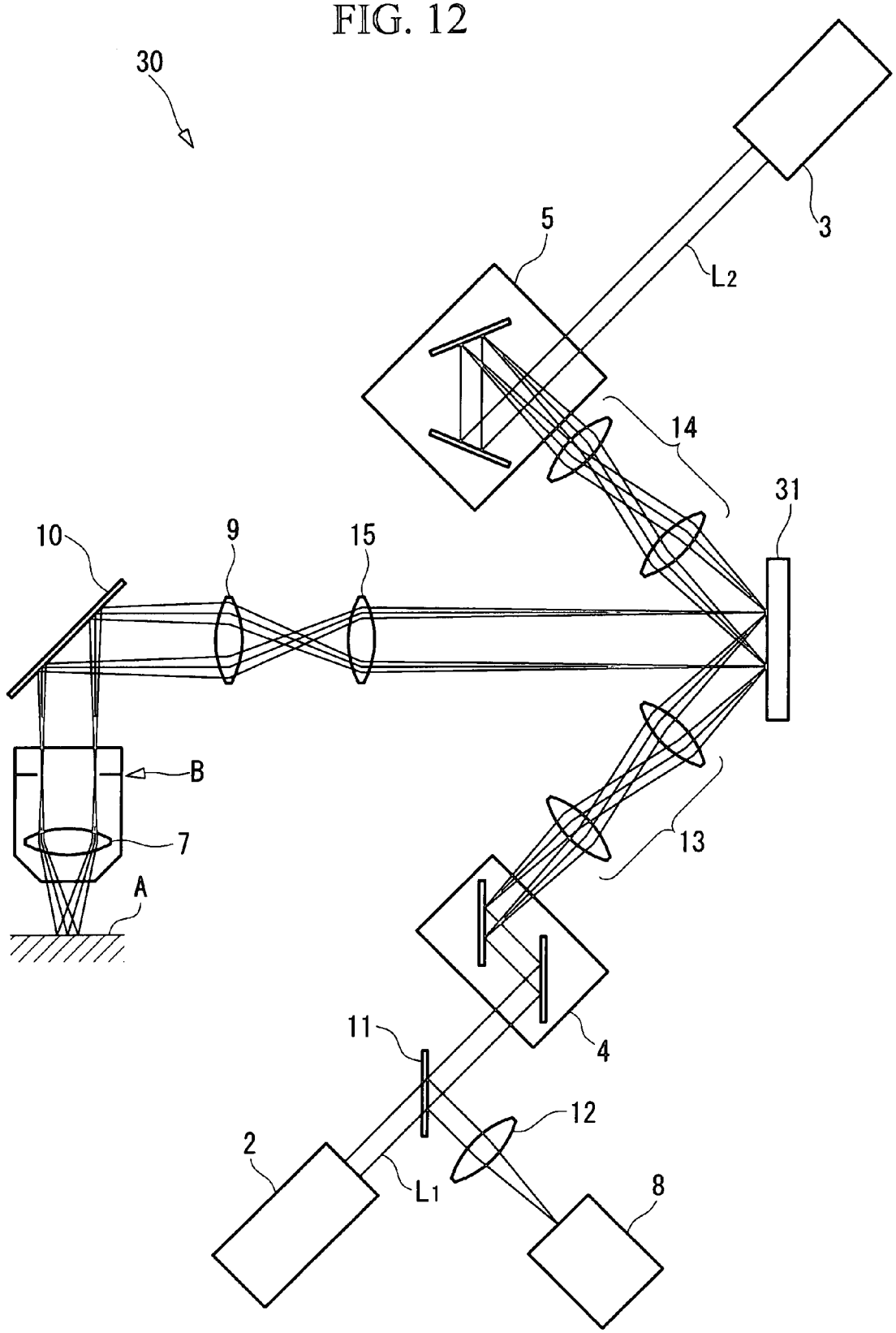
FIG. 12 shows a general configuration of a laser scanning microscope according to a third aspect of the present invention.

Then, a laser scanning microscope 30 according to a third embodiment of the present invention will be described with reference to FIG. 12. In the description of this embodiment, the same constituents as those of the laser scanning microscope 1 according the first embodiment are respectively denoted with the same reference numeral, and the explanation thereof is omitted.

The laser scanning microscope 30 according to this embodiment is different at the optical path combining portion 31 from the previous ones, as shown in FIG. 7. In this embodiment, the optical path combining portion 31 is composed of a digital micromirror device (DMD, a trade name) having a plurality of minute micromirrors disposed in a matrix form (not shown), the each micromirror being swingable. The respective micromirrors are settable in dual states (namely, the reflection direction qua a reflection characteristic is varied) by change in the swing position under control of electrical signals.

Also in this embodiment, the digital micromirror device (trade name) constituting the optical path combining portion 31 is positioned in an optically conjugate relationship with the first scanning portion 4, the second scanning portion 5, and the pupil B of the objective lens 7. Accordingly, regardless of the operating states of the first scanning portion 4 and the second scanning portion 5, the exciting observation light L1 and the stimulation light L2 are consistently incident to the same area on the optical path combining portion 31.

The respective micromirrors, when set in the first state, reflect the exciting observation light L1 incident from the first relay lenses 13 toward the third relay lens 15 while reflecting the stimulation light L2 incident from the second relay lenses 14 toward a position different from the third relay lens 15, and, when set in the second state, reflect the stimulation light L2 incident from the second relay lenses 14 toward the third relay lens 15 while reflecting the exciting observation light L1 incident from the first relay lenses 13 toward a position different from the third relay lens 15.

As the result, the exciting observation light L1 reflected by the micromirrors set in the first state and the stimulation light L2 reflected by the micromirrors set in the second state are respectively brought in an identical optical path directed to the third relay lens 15. The optical path combining portion 31 composed of the digital micromirror device (trade name) has no wavelength dependence because of having a plurality of micromirrors disposed, so all the light incident thereon are reflected.

The laser scanning microscope 30 configured as described above according to this embodiment, since the digital micromirror device (trade name) employed as the optical path combining portion 31 has no wavelength dependence, can operate with light having any wavelength without replacing the optical path combining portion 31 even when the wavelengths of the exciting observation light L1 and/or the stimulation light L2 are changed. Consequently, problems such as optical path fluctuation and the like at the reflective surface caused by the replacement can be precluded, and it becomes possible to accurately perform light stimulation and fluorescence observation. Further, in the laser scanning microscope 30 according to this embodiment, the respective pencil shapes of the exciting observation light L1 and the stimulation light L2 can be arbitrarily formed, so it becomes possible to perform light stimulation of a desired configuration matching to the specimen A.

As the optical path combining portion 31 composed of the digital micromirror device (trade name), it may also be possible to use a device having a reflection characteristic of the micromirrors changed by an electrical signal to either of a reflective state or a transmittable state. By this arrangement, the stimulation light L2 incident to a desired area can be selectively reflected and the exciting observation light L1 incident to the other area can be selectively transmitted; that is, the same effect as described above is achieved.

What is claimed is:

1. A laser scanning microscope comprising:
   an exciting observation light source emitting exciting observation light;
   a stimulation light source emitting stimulation light;
   a first scanning portion that two-dimensionally scans the exciting observation light emitted from the exciting observation light source across a specimen;
   a second scanning portion that sets a two-dimensional position on the specimen to which the stimulation light emitted from the stimulation light source is irradiated;
   an optical path combining portion that brings the exciting observation light scanned by the first scanning portion and the stimulation light positioned by the second scanning portion to an identical optical path;
   an objective lens that irradiates the specimen with at least one of the exciting observation light and the stimulation light passed through the optical path combining portion, and also collects fluorescence light emitted from the specimen; and
   a detecting portion that detects the fluorescence light collected by the objective lens,
   wherein the optical path combining portion is disposed so as to be optically conjugate to the first scanning portion and the second scanning portion.

2. The laser scanning microscope according to claim 1, wherein the optical path combining portion comprises an optical element having no wavelength dependence.

3. The laser scanning microscope according to claim 2, further comprising an incident-area setting portion between the stimulation light source and the optical path combining portion, wherein the incident-area setting portion sets an incident area of the stimulation light on the optical path combining portion which is different from an incident area of the exciting observation light on the optical path combining portion.

4. The laser scanning microscope according to claim 3, wherein the incident-area setting portion sets the incident area of the stimulation light outside the incident area of the exciting observation light on the optical path combining portion.

5. The laser scanning microscope according to claim 4, wherein the incident-area setting portion comprises a pair of axicon prisms.

6. The laser scanning microscope according to claim 4, wherein the incident-area setting portion comprises a pair of diffraction optical elements.

7. The laser scanning microscope according to claim 3, wherein the incident-area setting portion sets the incident area of the stimulation light inside the incident area of the exciting observation light on the optical path combining portion.

8. The laser scanning microscope according to claim 2, wherein the optical path combining portion comprises a mirror member having a ring-shaped reflective area and a transmitting area provided inside thereof.

9. The laser scanning microscope according to claim 2, wherein the optical path combining portion comprises a mirror member having a ring-shaped transmitting area and a reflective area provided inside thereof.

10. The laser scanning microscope according to claim 2, wherein the optical path combining portion comprises a plurality of optical elements which are disposed in a matrix form, and which change reflection characteristics according to electrical signals.

11. The laser scanning microscope according to claim 10, wherein the optical path combining portion comprises a digital micromirror device.

12. The laser scanning microscope according to claim 2, wherein the optical path combining portion comprises a reflective member that is divided into a plurality of areas having different surface reflectivities.

13. The laser scanning microscope according to claim 12, wherein the plurality of areas of the reflective member include a high-reflectivity area having a reflectivity of substantially 100% and a high-transmittivity area having a reflectivity of substantially zero.

14. The laser scanning microscope according to claim 13, wherein the plurality of areas are concentrically laid out on a surface of the reflective member with respect to an optical axis of the reflective member.

15. A laser scanning microscope comprising:

an exciting observation light source emitting exciting observation light;

a stimulation light source emitting stimulation light;

a first scanning portion that two-dimensionally scans the exciting observation light emitted from the exciting observation light source across a specimen;

a second scanning portion that sets a two-dimensional position on the specimen to which the stimulation light emitted from the stimulation light source is irradiated;

an optical path combining portion that brings the exciting observation light scanned by the first scanning portion and the stimulation light positioned by the second scanning portion to an identical optical path;

an objective lens that irradiates the specimen with at least one of the exciting observation light and the stimulation light passed through the optical path combining portion, and also collects fluorescence light emitted from the specimen;

a dichroic mirror that is disposed between the objective lens and the optical path combining portion that separates the exciting observation light and the fluorescence light; and a non-descan detecting portion that is disposed on an optical path of the flourescence light divided by the dichroic mirror for detecting the fluorescence light collected by the objective lens;

wherein the optical path combining portion comprises a polarizing beam splitter;

wherein respective polarization directions of the exciting observation light and the stimulation light incident on the polarizing beam splitter become different to each other; and wherein the exciting observation light is ultrashort-pulsed laser light that causes a multiphoton excitation effect in the specimen.

* * * * *